US012333911B2

(12) United States Patent
Nelson et al.

(10) Patent No.: US 12,333,911 B2
(45) **Date of Patent: *Jun. 17, 2025**

(54) PROVIDING LIVE SPORTING EVENT VIDEO AT GAMING DEVICES

(71) Applicant: IGT, Las Vegas, NV (US)

(72) Inventors: Dwayne Nelson, Las Vegas, NV (US); Steve Lemay, Reno, NV (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/498,750

(22) Filed: Oct. 31, 2023

(65) Prior Publication Data

US 2024/0062630 A1 Feb. 22, 2024

Related U.S. Application Data

(63) Continuation of application No. 17/490,556, filed on Sep. 30, 2021, now Pat. No. 11,837,054, which is a continuation of application No. 16/520,829, filed on Jul. 24, 2019, now Pat. No. 11,138,838.

(51) Int. Cl.

| | |
|---|---|
| ***A63F 9/24*** | (2006.01) |
| ***G06Q 50/34*** | (2012.01) |
| ***G07F 17/32*** | (2006.01) |

(52) U.S. Cl.
CPC ......... *G07F 17/3288* (2013.01); *G06Q 50/34* (2013.01); *G07F 17/3223* (2013.01)

(58) Field of Classification Search
None
See application file for complete search history.

(56) References Cited

U.S. PATENT DOCUMENTS

| | | | |
|---|---|---|---|
| 8,821,274 | B2 | 9/2014 | Lyons et al. |
| 9,269,222 | B2 | 2/2016 | Froy et al. |
| 2003/0119576 | A1 | 6/2003 | McClintic et al. |
| 2007/0087804 | A1 | 4/2007 | Knowles |
| 2008/0261683 | A1 | 10/2008 | Russell |
| 2008/0311971 | A1 | 12/2008 | Dean |
| 2011/0218044 | A1 | 9/2011 | Joshi |
| 2013/0059650 | A1 | 3/2013 | Sylla et al. |
| 2015/0141135 | A1 | 5/2015 | Elias |
| 2016/0300452 | A1 | 10/2016 | Cummings |
| 2020/0219363 | A1 | 7/2020 | Lancaster |

*Primary Examiner* — Lawrence S Galka
(74) *Attorney, Agent, or Firm* — Sage Patent Group

(57) ABSTRACT

A computer-implemented method of operating a gaming device includes providing, by a processor circuit of the gaming device, video of a sporting event to a display device of the gaming device. The method further includes determining, by the processor circuit, whether a wager has been selected from among a set of wagers which satisfies a wager requirement for continuing providing the video. The method further includes, in response to a determination that the wager requirement for continuing providing the video has not been satisfied, suspending, by the processor circuit, providing the video of the sporting event to the display device.

20 Claims, 6 Drawing Sheets

PROVIDING LIVE SPORTING EVENT VIDEO AT GAMING DEVICES

CROSS REFERENCE TO RELATED APPLICATIONS

The present application is a continuation of U.S. patent application Ser. No. 17/490,556, filed Sep. 30, 2021, entitled, "PROVIDING LIVE SPORTING EVENT VIDEO AT SPORTS GAMING DEVICES, AND RELATED SYSTEMS AND METHODS," which is a continuation of U.S. patent application Ser. No. 16/520,829, filed Jul. 24, 2019, entitled, "PROVIDING LIVE SPORTING EVENT VIDEO AT SPORTS GAMING DEVICES, AND RELATED SYSTEMS AND METHODS," the disclosures and content of which are incorporated herein in their entirety as set forth herein.

BACKGROUND

Embodiments described herein relate to providing video at gaming devices, and in particular to providing live sporting event video at sports gaming devices, and related systems and methods. Live sporting events have many aspects that make them attractive to spectators, both from an entertainment standpoint and a wagering and/or betting standpoint. Live sporting events may be viewed in person, e.g., in a sports venue such as ballpark or stadium, or remotely, e.g., in a casino or other environment, via a television or other video display. As technology improves and as the competition for the attention of bettors and spectators increases, there is a need for additional interactive features that increase spectator involvement and excitement.

SUMMARY

According to an embodiment, a gaming device includes a display device, a processor circuit, and a memory coupled to the processor circuit. The memory includes machine-readable instructions that, when executed by the processor circuit, cause the processor circuit to provide video of a sporting event to the display device, select a set of wagers that are associated with events in the sporting event, and provide an indication of the set of wagers to the display device. The instructions further cause the processor circuit to determine whether a wager has been selected from among the set of wagers which satisfies a wager requirement for continuing providing the video and, in response to a determination that the wager requirement for continuing providing the video has not been satisfied, provide an alert message to the display device comprising an indication of a time limit for selecting a wager and an indication that the video will suspend if a wager is not selected from among the set of wagers within the time limit.

According to some embodiments, a computer-implemented method of operating a gaming device includes providing, by a processor circuit of the gaming device, video of a sporting event to a display device of the gaming device. The method further includes determining, by the processor circuit, whether a wager has been selected from among a set of wagers which satisfies a wager requirement for continuing providing the video. The method further includes, in response to a determination that the wager requirement for continuing providing the video has not been satisfied, suspending, by the processor circuit, providing the video of the sporting event to the display device.

According to an embodiment, a gaming device includes a display device, a processor circuit, and a memory coupled to the processor circuit. The memory includes machine-readable instructions that, when executed by the processor circuit, cause the processor circuit to transmit a request to a content server in communication with the gaming device for video of a sporting event to be provided to the gaming device, and receive the video of the sporting event from the content server in response to the request. The instructions further cause the processor circuit to, in response to receiving the video of the sporting event from the content server, provide the video of the sporting event to the display device of the gaming device. The instructions further cause the processor circuit to determine a wager requirement for continuing providing the video, and determine whether the wager requirement for continuing providing the video has been satisfied. The instructions further cause the processor circuit to, in response to determining that the wager requirement for continuing providing the video has not been satisfied, cause the gaming device to suspend providing the video of the sporting event to the display device.

DETAILED DESCRIPTION

Figure 1:
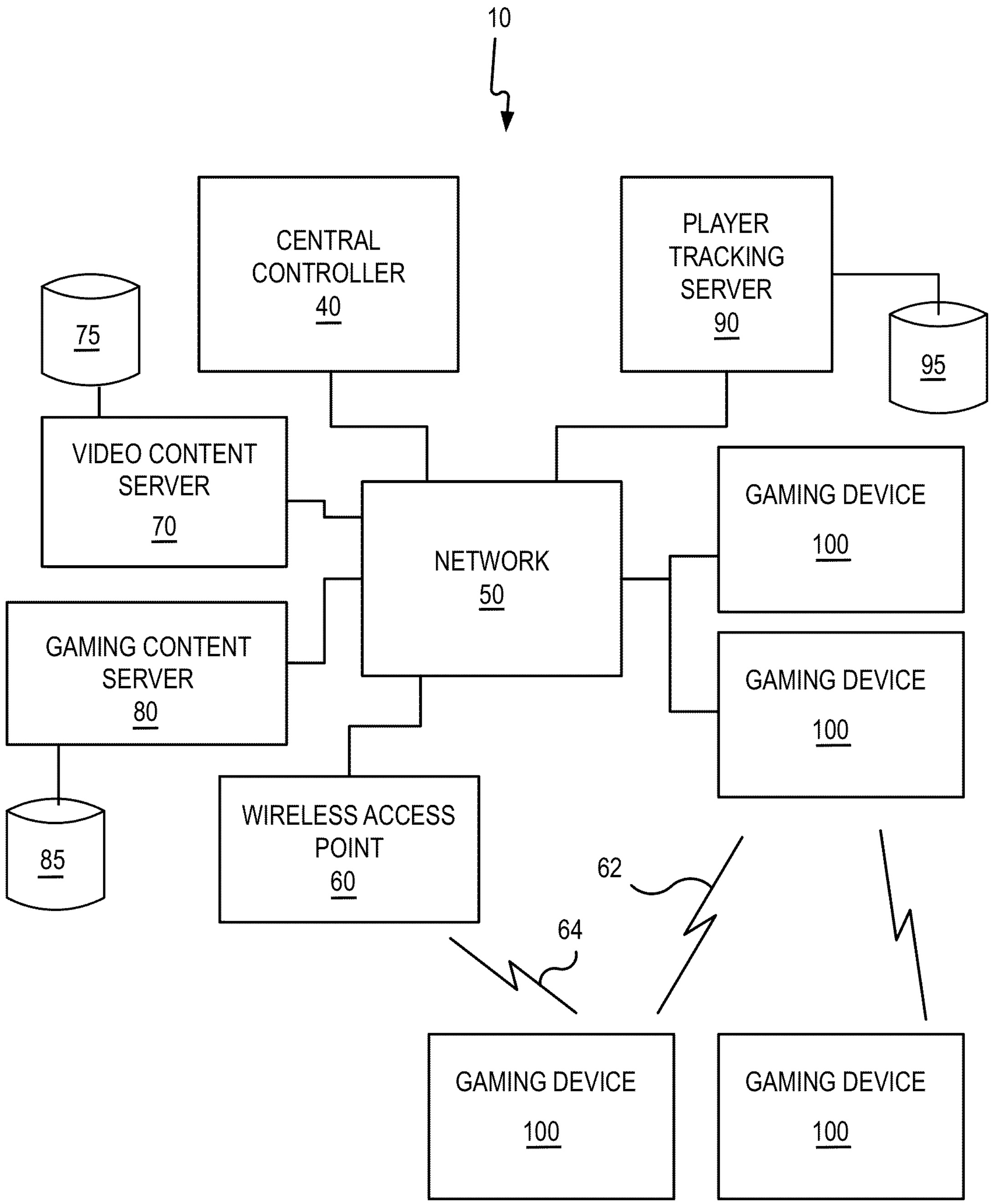
FIG. 1 is a schematic block diagram illustrating a network configuration for a plurality of gaming devices according to some embodiments.

Embodiments described herein relate to providing video at gaming devices, and in particular to providing live sporting event video at sports gaming devices, and related systems and methods. In some embodiments, a gaming system may determine a player status of a player using the gaming device and, based on the determined player status of the player, may provide video of a live sporting event to a display device of the gaming device. The gaming system may select a set of wagers that are associated with defined events in the live sporting event and provide an indication of the set of wagers to the display device. The system may include a wager or other requirement for continuing providing the video. For example, the system may require that the player place a wager within a predetermined time limit, or that the player place wagers at a predetermined rate or wager a predetermined amount within the predetermined time limit. The system may determine whether the player has selected a wager from among the set of wagers which satisfies the wager requirement. In response to determining that the player has not satisfied the wager requirement for continuing providing the video within the predetermined time limit, the system may suspend providing the video of the live sporting event to the gaming device. Conversely, in response to determining that the player has satisfied the wager requirement for continuing providing the video within the predetermined time limit, the system may continue providing the video of the live sporting event to the gaming device. In addition, after suspending providing the video, the system may also resume providing the video in response to determining that the player has satisfied a wager requirement for resuming providing the video, which may be the same as or different from the wager requirement for continuing providing the video.

Advantages of these and other embodiments include allowing users of a gaming device to place sporting bets and other bets while watching a live video stream of a sporting event while allowing an operator of the gaming device to automatically regulate viewing of the live video stream in response to the user placing (or not placing) bets at the gaming device. In some examples, gaming device may also allow the user to play traditional casino games (poker, keno, slots, etc.) and live table games, in addition to or as an alternative to placing sporting bets. In some embodiments, the gaming device may automatically switch from a first live sporting event to a second live sporting event, in response to the user placing a bet on the second live sporting event. A user may also choose a particular live sporting event from a set of available live sporting events, and the gaming device may then automatically present a wide variety of sporting bets associated with the selected live sporting event to the player. These and other embodiments solve the technical problem of managing and optimizing usage and access to viewing of live sporting events at devices that may generate significant revenue for an operator and that may be in high demand.

In this regard, FIG. 1 illustrates a system 10 including a plurality of gaming devices 100. The system 10 may be located, for example, on the premises of a gaming establishment, such as a casino, in a private residence, or may include components that are located at different locations. The gaming devices 100 may be in communication with each other and/or a central controller 40 through a data communication network 50, or remote communication link. The data communication network 50 may be a private data communication network that is operated, for example, by the gaming facility that operates the gaming device 100, a publicly accessible data communication network such as the Internet, or a combination thereof. Communications over the data communication network 50 may be encrypted for security. The central controller 40 may be any suitable server or computing device which includes at least one processing circuit, such as a processor, and at least one memory or storage device. Each gaming device 100 may include a processing circuit that transmits and receives events, messages, commands or any other suitable data or signal between the gaming device 100 and the central controller 40 and/or other gaming devices 100. The gaming device processor is operable to execute such communicated events, messages or commands in conjunction with the operation of the gaming device 100. Moreover, the processor of the central controller 40 is configured to transmit and receive events, messages, commands or any other suitable data or signal between the central controller 40 and each of the individual gaming devices 100. In some embodiments, one or more of the functions of the central controller 40 may be performed by one or more gaming device processors. Moreover, in some embodiments, one or more of the functions of one or more gaming device processors as disclosed herein may be performed by the central controller 40.

A wireless access point 60 provides wireless access to the data communication network 50. The wireless access point 60 may be connected to the data communication network 50 as illustrated in FIG. 1, or may be connected directly to the central controller 40 or another server connected to the data communication network 50.

One or more content servers, such as a video content server 70 and a gaming content server 80, may also be connected through the data communication network 50. The video content server 70 may manage delivery of the streaming video content to a user of a gaming device 100. The streaming video content may be stored in a video content database 75. Similarly, the gaming content server 80 may manage delivery of the gaming content to the user of a gaming device 100. The gaming content may be stored in a gaming content database 85. The video content server 70 and a gaming content server 80 may be implemented within or separately from each other. The video content server 70 and a gaming content server 80 may also be implemented within or separately from the central controller 40.

A player tracking server 90 may also be connected through the data communication network 50. The player tracking server 90 may manage a player tracking account that tracks the gameplay and spending and/or other player preferences and customizations of a player, i.e., the user of the gaming device 100, manages loyalty awards for the player, manages funds deposited or advanced on behalf of the player, and other functions. Player information managed by the player tracking server 90 may be stored in a player information database 95.

The gaming devices 100 communicate with one or more elements of the system 10 to coordinate providing streaming video content and synchronized gaming content. For example, in some embodiments, a gaming device 100 may communicate directly with another gaming device 100 over a wireless interface 62, which may be a WiFi link, a Bluetooth link, an NFC link, etc. In other embodiments, the gaming device 100 may communicate with the data communication network 50 (and devices connected thereto, including EGMs) over a wireless interface 64 with the wireless access point 160. The wireless interface 64 may include a WiFi link, a Bluetooth link, an NFC link, etc. In still further embodiments, the gaming device 100 may communicate with other gaming devices 100 or other devices over the wireless interface 62 and the wireless access point 60 over the wireless interface 64. In these embodiments, the wireless interface 62 and the wireless interface 64 may use different communication protocols and/or different communication resources, such as different frequencies, time slots, spreading codes, etc. For example, in some embodiments, the wireless interface 62 may be a Bluetooth link, while the wireless interface 64 may be a WiFi link.

The wireless interfaces 62, 64 allow the gaming devices 100 and/or central controller 40 to coordinate providing streaming video content and synchronized gaming content to the gaming devices 100.

In some embodiments, the central controller 40, video content server 70 and/or gaming content server 80 may coordinate the generation and display of the streaming video content and the synchronized gaming content to more than one user and/or to more than one gaming device 100. As described in more detail below, this may enable multiple users to interact with the same streaming video content and/or gaming content in real time. This feature can be used to provide a shared multiplayer experience to multiple users at the same time. Moreover, in some embodiments, the central controller 40, video content server 70 and/or gaming content server 80 may coordinate the generation and display of the streaming video content and the synchronized gaming content to users at different physical locations.

Figure 2:
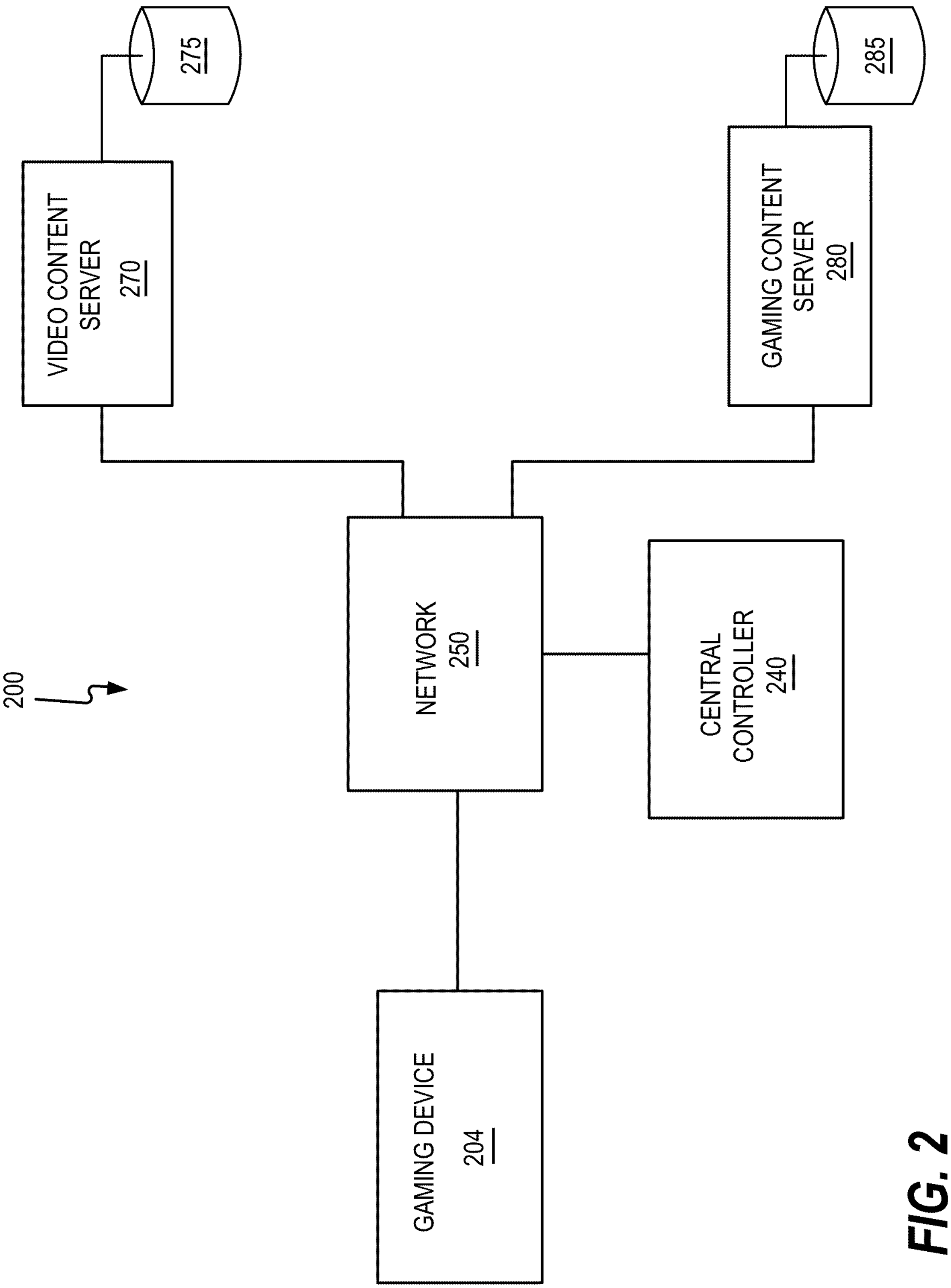
FIG. 2 is a schematic block diagram illustrating a network configuration including a streaming video content server and a gaming content server providing video of a live sporting event and gaming content at one or more gaming devices according to some embodiments.

Referring now to FIG. 2, a schematic block diagram illustrating network configurations for a system 200 including a video content server 270 and a gaming content server 280 is illustrated. The system 200 may include a gaming device 204 and a central controller 240 for providing streaming video content and gaming content to a user via the gaming device 204. In this example, the gaming device 204 is connected to the central controller 240 via a network 250, but it should be understood that the central controller 240 in some embodiments may be part of the gaming device 204 or may be connected to the gaming device 204 via a direct wired or wireless connection as well. A video content server 270 and a gaming content server 280 are also connected to the central controller 240 via the network 250 in this example.

In the embodiment of FIG. 2, a processor circuit of the central controller 240 may determine a player status of a player using the gaming device 204 in communication with the central controller 240. Based on the determined player status of the player, the central controller 240 instructs the streaming video content server 270 to provide video of a live sporting event to a display device of the gaming device 204 for display. The central controller 240 also instructs the gaming content server 280 to select a set of wagers that are associated with defined events in the live sporting event. For example, the live sporting event may be a football game that is currently in the second quarter of play, and the selected set of wagers may include wagers on which team will lead at the half, which team will win the game, a number of points scored by one or both teams, a number of scores of a particular type (e.g., touchdowns, field goals, safeties, etc.), a number of yards advanced, etc. After the set of wagers is provided to the gaming device 204 from the gaming content server 280 by the central controller 240, the central controller 240 determines whether the player has selected a wager from among the set of wagers which satisfies a wager requirement for continuing providing the video within a predetermined time limit. For example, the gaming system 200 may have a wager requirement that limits display of the video of the live sporting event to ten minutes between wagers, or that requires the player to place a number of wagers or wager a monetary amount at or above a predetermined rate to continue providing the video of the live sporting event.

If the central controller 240 determines that the player has not satisfied the wager requirement for continuing providing the video within the predetermined time limit, the central controller 240 may instruct the video content server 270 to suspend providing the video of the live sporting event to the gaming device 204. The video content server 270 may suspend providing the video to gaming devices 204 on an individual basis, or may suspend providing the video to multiple or additional gaming devices 204 entirely, as desired. In other embodiment, the video content server 240 may continue providing video to the gaming device 204, but the gaming device 204 would then individually suspend displaying the video, based on instructions from the central controller 240 and/or based on internal operations of the gaming device 204, for example.

After suspending providing the video, the central controller 240 may cause an alert message to be provided to the display device of the gaming device 204, which may include an indication of a wager requirement for resuming providing the video. If the central controller 240 determines that the player has satisfied the wager requirement for resuming providing the video, the central controller 240 may instruct the video content server 270 to resume providing the video of the live sporting event to the display device of the gaming device 204 for display. It should be understood that in this and other embodiments, the video content and the game content may be provided separately, from different providers, or may be provided by a common provider, as desired. For example, in some embodiments, the video content and the gaming content can be synchronized in advance and may also be provided on a common data stream, as desired.

Figure 3:
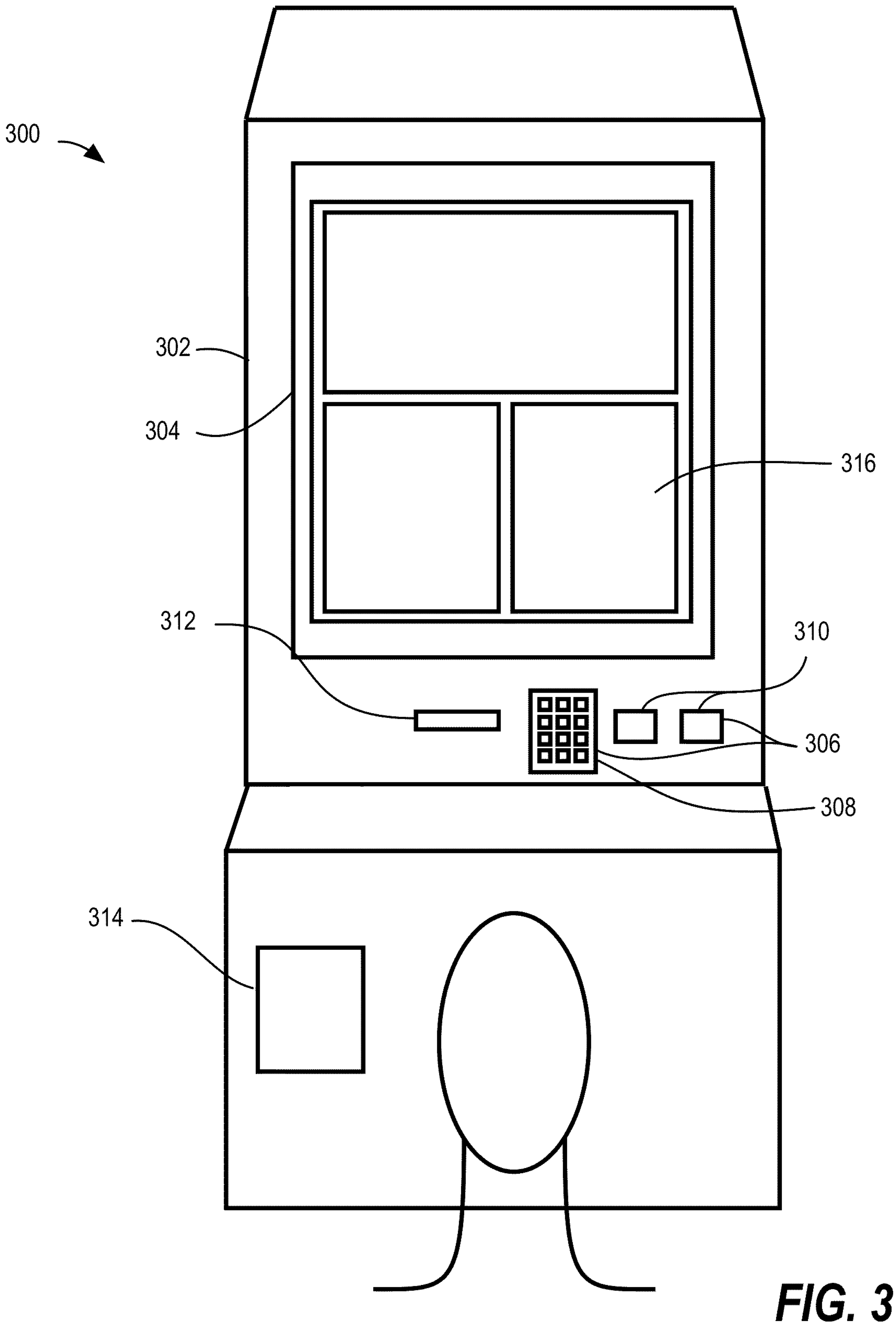
FIG. 3 illustrates a gaming terminal for providing video of a live sporting event and gaming content according to some embodiments.

As used herein, a gaming device may include, for example, an electronic gaming device such as an electronic gaming machine (EGM), gaming terminal, etc., an electromechanical gaming device, a computing device such as a personal computer, a mobile computing device such as a tablet, smartphone, etc., or another device or devices. In this regard, FIG. 3 illustrates a dedicated gaming terminal 300 for providing video of a live sporting event and gaming content according to some embodiments. In this embodiment, the gaming terminal 300 includes a housing 302 having a display device 304, and a plurality of input devices 306, such as a keypad or buttons 310, etc., for receiving user input for playing the wagering game and otherwise interacting with the gaming terminal 300. In some embodiments, the display device 304 may include a touchscreen interface for receiving user input as well. The display device 304 may also be a single display device or may include multiple display devices, such as a first display device 304 for displaying video of the live sporting event and a second display device 308 for displaying gaming and wagering information for example. The gaming terminal 300 may include additional specialized hardware as well, such as an acceptor 312, for receiving currency (i.e., bills and/or coins), tokens, credit or debit cards, or other physical items associated with monetary or other value. The gaming terminal 300 may also include a dispenser 314, for dispensing items, such as physical items having monetary or other value (e.g., awards or prizes) or other items.

As will be discussed in detail below, the gaming terminal 300 may include a processor circuit and a memory coupled to the processor circuit. The memory may include machine-readable instructions that, when executed by the processor circuit, cause the processor circuit to perform operations for operating the gaming terminal 300 and/or other features described herein. In this example, the gaming terminal 300 may include a graphical user interface (GUI) 316 displayed by the display device 304 for providing the video and gaming information to the player.

Figure 4:
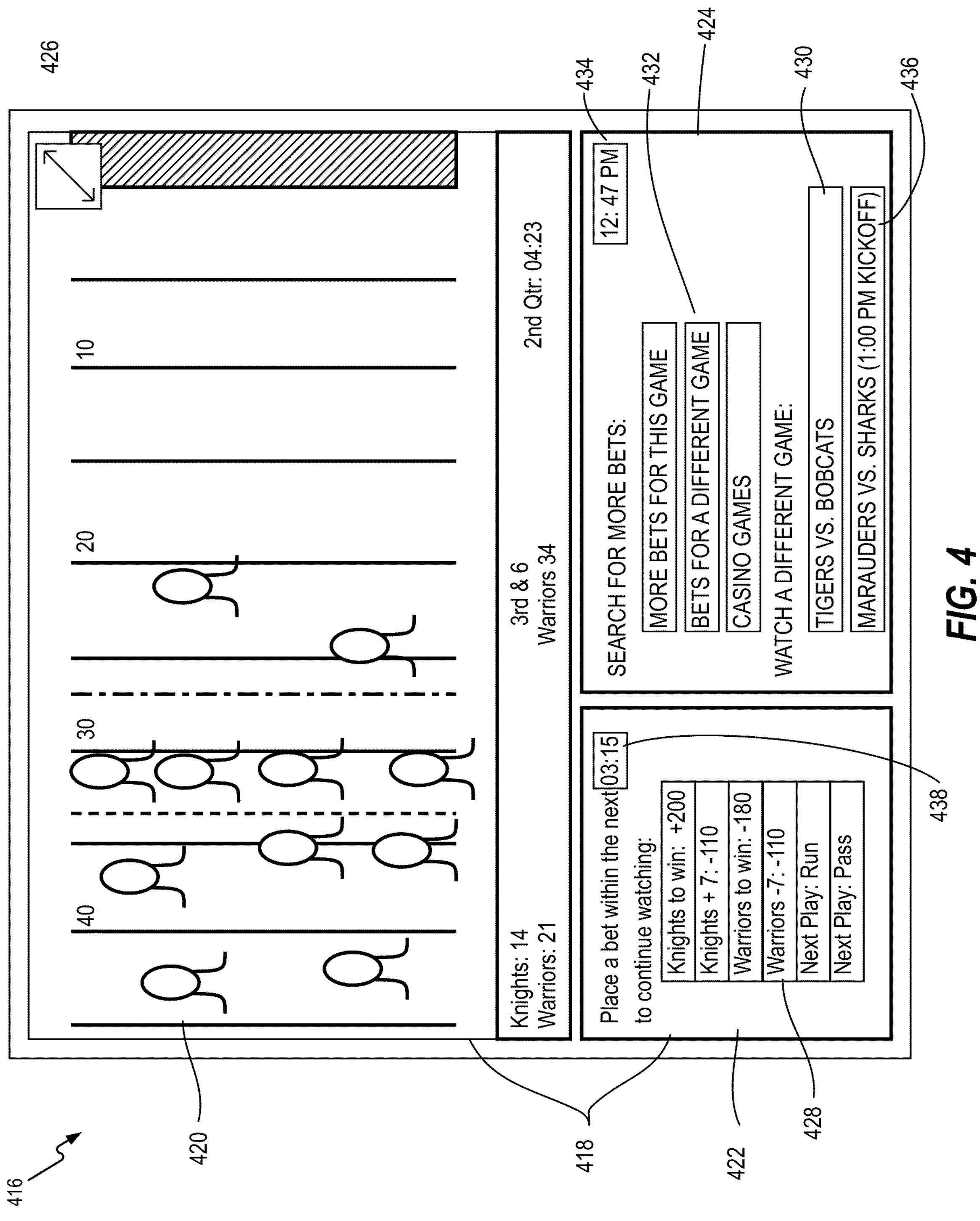
FIG. 4 is a diagram of a graphical user interface for a gaming device including video of a live sporting event and gaming content displayed on a display of a gaming terminal, according to some embodiments.

In this regard, FIG. 4 is a diagram of a GUI 416 for a gaming device including video of a live sporting event and gaming content displayed on a display of a gaming terminal, according to some embodiments. In this example, as shown by FIG. 4, the GUI 416 is partitioned into different display areas 418, including a live video area 420, a wager selection area 422, and a control interface area 424. It should be understood, however, that additional features may be provided by the GUI 416, such as multiple live video windows, a casino gaming betting interface area, social game interface area, and/or a service window area, for example, as desired.

The live video area 420 may provide video of the live sporting event. In some examples, live video area 420 may be resizable to take up a larger or smaller portion of the display area of the GUI 416. For example, the player may select a full screen toggle option 426 that causes the live video area 420 to enter a full screen mode that fills the entire display area of the GUI 416. The player may manually exit the full screen mode to view and/or place wagers by re-selecting the full screen toggle option 426. In some examples, the full screen mode may also be subject to a time limit that automatically exits the full screen mode after a predetermined amount of time, for example, to encourage the player to place additional wagers.

The wager selection area 422 may include a plurality of wagers 428, some or all of which may correspond to the live sporting event being displayed in the live video area 420. Alternatively, or in addition, the plurality of wagers 428 may include wagers for other live sporting events. In some embodiments, a player selecting a wager from the plurality of wagers 428 for a different live sporting event may cause the GUI 416 to suspend displaying the current video of the live sporting event and begin displaying video of the different live sporting event.

The control interface area 424 may include a search function 430 that may allow a user to search for particular wagers using a plurality of different criteria, such as additional bets for the current game, bets for a different game, and/or bets for casino games. Additional search criteria may include a type of sport, a particular event, a data, a bet type, or a bet amount, for example. The control interface area 424 may also provide a user with the option 432 to select a different game to watch, and may provide additional information, such as a current time 434 and/or a time at which games are scheduled to begin 436, for example. The wager selection area 422 may also update its display of available bets in real time or near real time as new bets (such as betting on the next play or the next player) or updated bets become available.

It should be appreciated that there are thousands of possible sports wagers at any given time, and that these and other user interfaces may be customized to allow a user to access desired content more quickly and efficiently. For example, a user may scroll through a list of sports, then through a list of games, and then through a list of bets associated with a selected game. Likewise, there may be many live video channels and/or sporting events available, which can be accessed in a similar manner. In some embodiments, a user may select a live video channel and/or sporting event, and the user interface may update based on the selection to present a selection of wagers relating to the sporting event, sport, hometown, player preferences, etc. Conversely, in response to a user selecting a particular wager, the user interface may automatically switch to a channel showing the sporting event associated with the wager, or may filter a display of sporting events relating to the same sport, event type, hometown, etc.

The GUI 416 or other user interface may be configured in additional ways as well. For example, the GUI 416 may include a timeout function 438 that gives the user a predetermined amount of time to place a wager before providing the live video is suspended. In some embodiments, qualifying wagers may be limited to wagers on the live sporting or other event being watched, or may include wagers on other sporting events, wagers on slot or table games, or other types of wagers. In some embodiments, display of the live video may be limited to the sporting or other events on which the user has placed a wager. In another example, other types of spending, such as spending on food and beverage service, show tickets, casino services, etc., may qualify and allow the video to continue to be provided. In some examples, placing a wager on a sporting event may permit the user to watch the entire sporting event.

In some examples, after suspending providing the video, an alert message to the display device, the alert message including an indication of a wager requirement for resuming providing the video. In response to determining that the player has satisfied the wager requirement for resuming providing the video, providing the video of the live sporting event may be resumed. The wager requirement for resuming providing the video may include the player selecting a wager from among the set of wagers at the gaming device, or from among a second set of wagers at the gaming device different form the original set of wagers. The second set of wagers may be selected from a superset of wagers based on a determined current time value of the live sporting event. Each wager of the superset of wagers may include a valid time duration value representative of a time the wager is valid, and each wager of the second set of wagers may include a valid time duration that includes the current time value of the live sporting event. Alternatively, or in addition, the wager requirement for resuming providing the video may include the player placing wagers at the gaming device at a predetermined rate over a predetermined period of time.

In some examples, the amount of time a user can watch live video without using the wagering facilities may be controlled by an operator (e.g., a casino host), or by an amount of activity on the floor. For example, if a sports book is busy, the timeout might be 5 minutes, but if the sports book is empty, the timeout might be 2 hours. The activity level can be determined by the number of bets being placed, the number of buttons presses detected, by sensors or camera measuring the number of patrons, by a date and time which corresponds to a known large event (such as the Super Bowl), etc.

The amount of time the user can watch live video may also be a function of their player loyalty account status, points or activity. The user's account may also include player preferences for the user's favorite sports and betting types, for example. When the user logs into the terminal using a player account (login, player card, mobile device, etc.), the live video and betting area and be automatically configured for the user, automatically presenting the live video content and offering wagers based on the user's preferences.

In some embodiments, an alert message or other indication may be provided to a user prior to suspending providing the video of the live sporting event. The alert may include an indication of a time that providing the video will suspend absent the player selecting a wager from among the set of wagers. For example, the timeout function 438 of FIG. 4 may provide an indication to the user of a time when providing the video will be suspended. In some embodiments, if the player selecting a wager from among the set of wagers satisfying the wager requirement for continuing providing the video, the video of the live sporting event will continue being provided to the display device. In some embodiments, a duration of the predetermined time limit may be determined based on the player status of the player.

According to some embodiments, a listing of live sporting events may be provided to the display device. In response to receiving a notification identifying that the live sporting event has been selected by the player from among the listing of live sporting events through a player-machine interface, and based on the determined player status of the player, the live sporting event may be provided to the display device, and the set of wagers that are associated with the event in the live sporting event may be selected based on the notification.

In another example, a current time value of the live sporting event may be determined, and the set of wagers may be selected from a superset of wagers based on the current time value. In this example, each wager of the superset of wagers may include a valid time duration value representative of a time the wager is valid, and each wager of the set of wagers may include a valid time duration that includes the current time value of the live sporting event.

The wager requirement for continuing providing the video may also include a requirement that the player place wagers at the gaming device at a predetermined rate over a predetermined period of time. In response to determining that the player has not placed wagers at the gaming device at the predetermined rate over the predetermined period of time, providing the video of the live sporting event to the display device may be suspended.

In some examples, a duration of the predetermined time limit may be determined based on a predetermined schedule. The duration of the predetermined time limit may be a first duration during a first time period and may be a second duration during a second time period. For example, the predetermined time limit may be longer during slow times, e.g., weekday mornings, and may be shorter during busy time, e.g., weekend afternoons and evenings. In another embodiment, based on determining whether wagers are being placed on live sporting events by other players above a predetermined threshold rate over a predetermined period, the predetermined time limit may be reduced from a first duration to a second duration. This allows the time to be reduced in response to unexpected increases in activity, which may indicate an increased demand for the gaming device.

In another example, a player preference for types of wagers may be determined based on querying a player database using an identifier of the player. The set of wagers may be selected from among a superset of available wagers that are associated with defined events in the live sporting event, based on the player preference.

In some examples, in response to determining that the player has selected a wager from among a second set of wagers associated with a second live sporting event, providing the video of the first live sporting event may be suspended and video of the second live sporting event may be provided to the display device of the gaming device.

Figure 5:
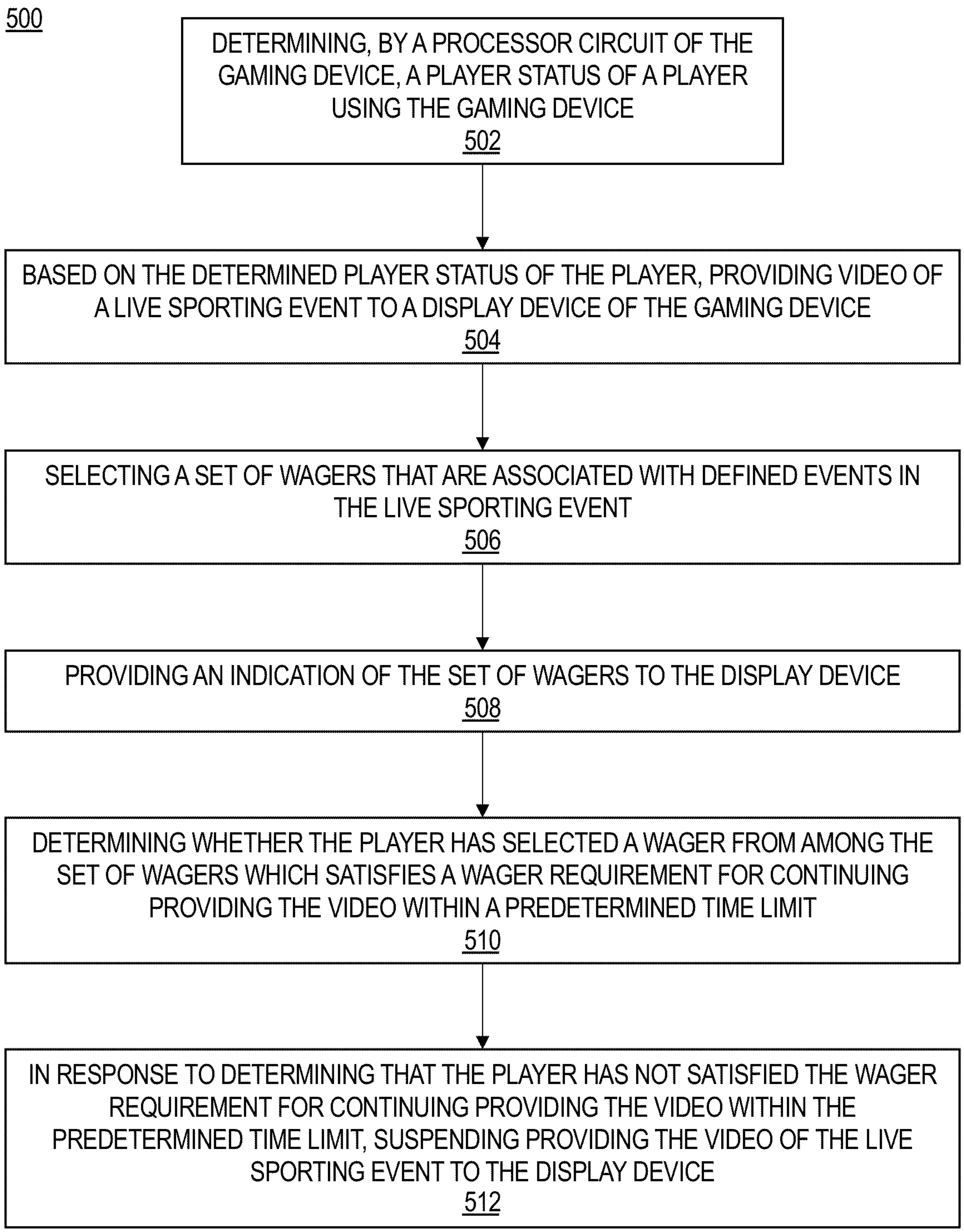
FIG. 5 is a flowchart illustrating operations of systems/methods according to some embodiments.

These and other features may be implemented as operations that may be executed by a processor circuit of a computing device. In this regard, FIG. 5 is a flowchart illustrating operations 500 of systems/methods according to some embodiments. The operations 500 may include determining, by a processor circuit of the gaming device, a player status of a player using the gaming device (Block 502). The operations 500 may further include, based on the determined player status of the player, providing video of a live sporting event to a display device of the gaming device (Block 504). The operations 500 may further include selecting a set of wagers that are associated with defined events in the live sporting event (Block 506). The operations 500 may further include providing an indication of the set of wagers to the display device (Block 508). The operations 500 may further include determining whether the player has selected a wager from among the set of wagers which satisfies a wager requirement for continuing providing the video within a predetermined time limit (Block 510). The operations 500 may further include, in response to determining that the player has not satisfied the wager requirement for continuing providing the video within the predetermined time limit, suspending providing the video of the live sporting event to the display device (Block 512).

Figure 6:
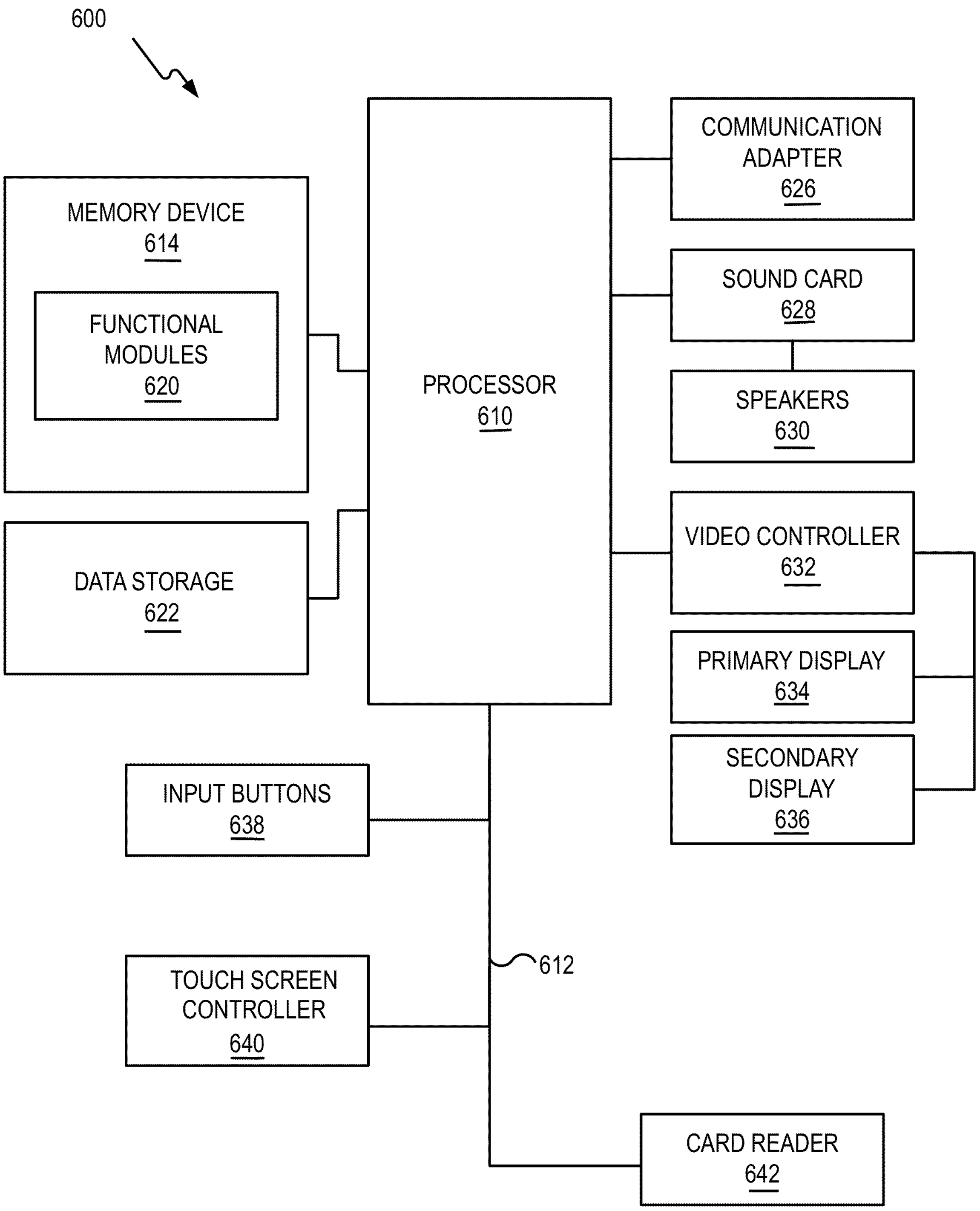
FIG. 6 is a schematic block diagram illustrating various components of a computing device according to some embodiments.

Referring now to FIG. 6, a block diagram that illustrates various components of a computing device 600, which may embody or be included as part of the devices, systems, and/or components above, according to some embodiments. As shown in FIG. 6, the computing device 600 may include a processor circuit 610 that controls operations of the computing device 600. Although illustrated as a single processor, multiple special purpose and/or general-purpose processors and/or processor cores may be provided in the computing device 600. For example, the computing device 600 may include one or more of a video processor, a signal processor, a sound processor and/or a communication controller that performs one or more control functions within the computing device 600. The processor circuit 610 may be variously referred to as a "controller," "microcontroller," "microprocessor" or simply a "computer." The processor circuit 610 may further include one or more application-specific integrated circuits (ASICs).

Various components of the computing device 600 are illustrated in FIG. 6 as being connected to the processor circuit 610. It will be appreciated that the components may be connected to the processor circuit 610 and/or each other through one or more busses 612 including a system bus, a communication bus and controller, such as a USB controller and USB bus, a network interface, or any other suitable type of connection.

The computing device 600 further includes a memory device 614 that stores one or more functional modules 620 for performing the operations described above. Alternatively, or in addition, some of the operations described above may be performed by other devices connected to the network, such as the network 50 of the system 10 of FIG. 1, for example. The computing device 600 may communicate with other devices connected to the network to facilitate performance of some of these operations. For example, the computing device 600 may communicate and coordinate with certain displays to identify elements of a race being displayed by a particular display.

The memory device 614 may store program code and instructions, executable by the processor circuit 610, to control the computing device 600. The memory device 614 may include random access memory (RAM), which can include non-volatile RAM (NVRAM), magnetic RAM (ARAM), ferroelectric RAM (FeRAM) and other forms as commonly understood in the gaming industry. In some embodiments, the memory device 614 may include read only memory (ROM). In some embodiments, the memory device 614 may include flash memory and/or EEPROM (electrically erasable programmable read only memory). Any other suitable magnetic, optical and/or semiconductor memory may operate in conjunction with the gaming device disclosed herein.

The computing device 600 may include a communication adapter 626 that enables the computing device 600 to communicate with remote devices, such as the wireless network, another computing device 600, and/or a wireless access point, over a wired and/or wireless communication network, such as a local area network (LAN), wide area network (WAN), cellular communication network, or other data communication network, e.g., the network 50 of FIG. 1.

The computing device 600 may include one or more internal or external communication ports that enable the processor circuit 610 to communicate with and to operate with internal or external peripheral devices, such as a sound card 628 and speakers 630, video controllers 632, a primary display 634, a secondary display 636, input buttons 638 or other devices such as switches, keyboards, pointer devices, and/or keypads, a touch screen controller 640, a card reader 642, currency acceptors and/or dispensers, cameras, sensors such as motion sensors, mass storage devices, microphones, haptic feedback devices, and/or wireless communication devices. In some embodiments, internal or external peripheral devices may communicate with the processor through a universal serial bus (USB) hub (not shown) connected to the processor circuit 610. Although illustrated as being integrated with the computing device 600, any of the components therein may be external to the computing device 600 and may be communicatively coupled thereto. Although not illustrated, the computing device 600 may further include a rechargeable and/or replaceable power device and/or power connection to a main power supply, such as a building power supply.

In some embodiments, the computing device 600 may include a head mounted device (HMD) and may include optional wearable add-ons that include one or more sensors and/or actuators. Including ones of those discussed herein. The computing device 600 may be a head-mounted mixed-reality device configured to provide mixed reality elements as part of a real-world scene being viewed by the user wearing the computing device 600.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks. The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. A gaming device comprising:

a display device;

a processor circuit; and a memory coupled to the processor circuit, the memory comprising machine-readable instructions that, when executed by the processor circuit, cause the processor circuit to:

provide video of a sporting event to the display device;

select a set of wagers that are associated with events in the sporting event;

provide an indication of the set of wagers to the display device;

determine whether a wager has been selected from among the set of wagers which satisfies a wager requirement for continuing providing the video; and in response to a determination that the wager requirement for continuing providing the video has not been satisfied, provide an alert message to the display device comprising an indication of a time limit for selecting a wager and an indication that the video will suspend if a wager is not selected from among the set of wagers within the time limit.

2. The gaming device of claim 1, wherein the machine-readable instructions further cause the processor circuit to:

determine whether a wager has been selected from among the set of wagers within the time limit; and in response to a determination that the wager requirement for continuing providing the video has not been satisfied within the time limit, suspend providing the video of the sporting event to the display device.

3. The gaming device of claim 2, wherein the machine-readable instructions further cause the processor circuit to:

after suspending providing the video, provide an alert message to the display device, the alert message comprising an indication of a wager requirement for resuming providing the video; and in response to determining that the wager requirement for resuming providing the video has been satisfied, resume providing the video of the sporting event to the display device.

4. The gaming device of claim 3, wherein the wager requirement for resuming providing the video comprises selection of a wager from among the set of wagers at the gaming device, and wherein the machine-readable instructions further cause the processor circuit to:

determine that a wager has been selected from among the set of wagers at the gaming device, and in response to determining that the wager has been selected from among the set of wagers at the gaming device, resume providing the video to the display device.

5. The gaming device of claim 3, wherein the wager requirement for resuming providing the video comprises selection of a wager from among a second set of wagers at the gaming device, and wherein the machine-readable instructions further cause the processor circuit to:

determine a current time value of the sporting event; and select the second set of wagers from a superset of wagers based on the current time value of the sporting event, wherein each wager of the superset of wagers comprises a valid time duration value representative of a time the wager is valid, and wherein each wager of the second set of wagers comprises a valid time duration that comprises the current time value of the sporting event.

6. The gaming device of claim 3, wherein the wager requirement for resuming providing the video comprises placement of wagers at the gaming device at a predetermined rate over a predetermined period of time, and wherein the machine-readable instructions further cause the processor circuit to:

determine whether wagers have been placed at the gaming device at the predetermined rate over the predetermined period of time, and in response to determining that wagers have been placed at the gaming device at the predetermined rate over the predetermined period of time, resume providing the video of the sporting event to the display device.

7. The gaming device of claim 2, wherein the machine-readable instructions further cause the processor circuit to:

in response to a selection of a wager from among the set of wagers that satisfies the wager requirement for continuing providing the video within the time limit, continue providing the video of the sporting event to the display device.

8. The gaming device of claim 1, wherein the machine-readable instructions further cause the processor circuit to:

provide a listing of sporting events to the display device;

receive a notification identifying that the sporting event has been selected from among the listing of sporting events through a player-machine interface;

based on the notification, provide the video of the sporting event to the display device; and select the set of wagers that are associated with the sporting event in the sporting event based on the notification.

9. The gaming device of claim 1, wherein the machine-readable instructions further cause the processor circuit to:

determine a current time value of the sporting event; and select the set of wagers from a superset of wagers based on the current time value of the sporting event, wherein each wager of the superset of wagers comprises a valid time duration value representative of a time the wager is valid, and wherein each wager of the set of wagers comprises a valid time duration that comprises the current time value of the sporting event.

10. The gaming device of claim 1, wherein the wager requirement for continuing providing the video further comprises placement of wagers at the gaming device at a predetermined rate over a predetermined period of time, and wherein the machine-readable instructions further cause the processor circuit to:

determine whether wagers have been placed at the gaming device at the predetermined rate over the predetermined period of time, and in response to determining that wagers have not been placed at the gaming device at the predetermined rate over the predetermined period of time, suspend providing the video of the sporting event to the display device.

11. The gaming device of claim 1, wherein the machine-readable instructions further cause the processor circuit to determine the time limit based on a player status of a player at the gaming device.

12. The gaming device of claim 1, wherein the machine-readable instructions further cause the processor circuit to determine the time limit based on a predetermined schedule, wherein a duration of the time limit is a first duration during a first time period and the duration of the time limit is a second duration during a second time period.

13. The gaming device of claim 1, wherein the machine-readable instructions further cause the processor circuit to:

determine whether wagers have been placed on sporting events by a plurality of players above a predetermined threshold rate over a predetermined period; and reduce the time limit from a first duration to a second duration based on determining that wagers have being placed on sporting events by the plurality of players above the predetermined threshold rate over the predetermined period.

14. The gaming device of claim 1, wherein the machine-readable instructions further cause the processor circuit to:

determine a player preference for types of wagers based on querying a player database using an identifier of a player at the gaming device, and select the set of wagers from among a superset of available wagers that are associated with events in the sporting event, based on the player preference.

15. The gaming device of claim 1, wherein the machine-readable instructions further cause the processor circuit to:

determine whether the a wager has been selected from among a second set of wagers associated with a second sporting event; and in response to determining that a wager has been selected from among the second set of wagers, suspend providing the video of the sporting event and provide video of the second sporting event to the display device.

16. A computer-implemented method of operating a gaming device comprising:

providing, by a processor circuit of the gaming device, video of a sporting event to a display device of the gaming device;

determining, by the processor circuit, whether a wager has been selected from among a set of wagers which satisfies a wager requirement for continuing providing the video; and in response to a determination that the wager requirement for continuing providing the video has not been satisfied, suspending, by the processor circuit, providing the video of the sporting event to the display device.

17. The computer-implemented method of claim 16, further comprising providing, by the processor circuit, a slot game at the gaming device, wherein the wager which satisfies the wager requirement comprises a wager on the slot game.

18. The computer-implemented method of claim 16, further comprising:

after suspending providing the video, providing an alert message to the display device, the alert message comprising an indication of a wager requirement for resuming providing the video; and in response to determining that the wager requirement for resuming providing the video has been satisfied, resuming providing the video of the sporting event to the display device.

19. A gaming device comprising:

a display device;

a processor circuit; and a memory coupled to the processor circuit, the memory comprising machine-readable instructions that, when executed by the processor circuit, cause the processor circuit to:

transmit a request to a content server in communication with the gaming device for video of a sporting event to be provided to the gaming device;

receive the video of the sporting event from the content server in response to the request;

in response to receiving the video of the sporting event from the content server, provide the video of the sporting event to the display device of the gaming device;

determine a wager requirement for continuing providing the video;

determine whether the wager requirement for continuing providing the video has been satisfied; and in response to determining that the wager requirement for continuing providing the video has not been satisfied, cause the gaming device to suspend providing the video of the sporting event to the display device.

20. The gaming device of claim 19, wherein the determination whether the wager requirement for continuing providing the video has been satisfied comprises a determination of wherein a wager on a slot game at the gaming device has been placed.

* * * * *